United States Patent

[11] 3,558,862

[72] Inventor David E. McMillan
Billerica, Mass.

[21] Appl. No. 816,235
[22] Filed Apr. 15, 1969
[45] Patented Jan. 26, 1971
[73] Assignee the United States of America as represented by the United States Atomic Energy Commission

[54] CIRCUIT FOR DIMENSIONAL VERIFICATION OF PUNCHED TAPES
2 Claims, 3 Drawing Figs.

[52] U.S. Cl. .......... 235/61.7, 73/157; 235/61.11
[51] Int. Cl. .......... G06k 5/04, G06k 7/10, G01b 5/16
[50] Field of Search .......... 73/157; 250/219ID; 356/167; 235/61.7, 61.115, 61.112

[56] References Cited

UNITED STATES PATENTS

| | | | |
|---|---|---|---|
| 2,641,956 | 6/1953 | Morrison | 73/157 |
| 2,934,949 | 5/1960 | Grunwald | 73/157 |
| 3,044,695 | 7/1962 | Burr | 235/61.115 |
| 3,067,934 | 12/1962 | Amacher | 235/61.115 |
| 3,174,029 | 3/1965 | Cunningham | 235/61.7 |
| 3,222,501 | 12/1965 | Wood | 235/61.7 |
| 3,330,178 | 7/1967 | Timson | 73/157 |
| 3,461,305 | 2/1967 | Moulton | 250/219Id |

*Primary Examiner*—Daryl W. Cook
*Assistant Examiner*—Robert M. Kilgore
*Attorney*—Roland A. Anderson

ABSTRACT: A circuit has been provided for verifying punched tapes used in digital data storage to determine whether the spacing between lines of information is within tolerance. A photodiode is exposed successively by the tapes' sprocket holes, thus developing a signal whose duration is proportional to the "dark time" between the holes. This signal is compared on a time basis with a generated timing signal based on the number of constant frequency clock pulses registered by a binary counter and produces an error signal which is used to turn the tape reader "off" upon detecting an increase or decrease in the dark time.

INVENTOR.
David E. McMillan
BY
ATTORNEY.

INVENTOR.
David E. McMillan
BY
[signature]
ATTORNEY.

CIRCUIT FOR DIMENSIONAL VERIFICATION OF PUNCHED TAPES

BACKGROUND OF THE INVENTION

This invention was made during the course of, or under, a contract with the U.S. Atomic Energy Commission.

The present invention relates to tape readers of the digital data punched tape type and more specifically to a device for verifying the hole alignment accuracy of punched tapes having sprocket holes aligned with the punched information columns.

In many computer operated or monitored manufacturing processes and various other computer operations, digital data is frequently stored in various types of movable storage media such as punched paper tape, magnetic tape, electrostatic tape, or the like. In the case of punched paper tape, for example, the tapes are punched with laterally extending "lines" of information, each line comprising a series of aligned holes. In the tape-punching operation, the holes comprising a line of information are punched simultaneously, along with a comparatively small sprocket hole associated with that line. The sprocket hole must be within specified tolerances, in alignment with its associated line of information.

Ideally, the line-to-line spacing on a punched tape would not vary from the design value. In practice, however, some variation does occur. At comparatively low punching speeds (e.g., 60 lines a second) the amount of variation may not be large enough to interfere with proper reading of the tape by a reader, such as a photoelectric tape reader. At high punching speeds (e.g., greater than 150 lines a second) the variation may be sufficient to alter the desired input to the tape reader, thus introducing an error into the operation under tape control. Such errors often result in expensive losses in both time and material.

In the art, there have been various schemes for checking or compensating line misalignment of punched tapes. For example, a copending U.S. application Ser. No. 616,436, filed Feb. 15, 1967, entitled "A System for Controlling the Response of a Photoelectric Tape Reader" by Moulton, now Pat. No. 3,461,305, issued Aug. 12, 1969, illustrates a system which senses the leading one of a line of punched holes and delays a reader to allow the leading hole to be centered over its photodiode reader, thereby compensating for slight misalignment.

Other systems, such as that presented in U.S. Pat. No. 3,222,501, issued Dec. 7, 1965, entitled "Sprocket Hole Checking System" by Wood, suggest verifying each sprocket hole by placing a pair of photoelectric sensing devices adjacent the tape and aligning the devices to sense simultaneously immediately adjacent sprocket holes as it is moved past the sensing elements. Deviations in the nonsimultaneous activation of the pairs of sensing devices generate a signal indicating an abnormality of the tape sprocket holes.

SUMMARY OF THE INVENTION

The present apparatus is directed specifically to apparatus for detecting with a greater degree of speed and accuracy than that of prior art devices the exact spacing between the sprocket holes of a punched tape. Briefly, this circuit is designed to be used in conjunction with a single photodiode which is positioned to read a selected longitudinal channel of holes of the punched tape while the tape is driven at a constant velocity. The photodiode is energized by light passing through the holes in the channel and is masked by the regions therebetween. A signal proportional to the photodiode dark time, e.g., the spacing between the information lines on the tape, is fed into a special logic circuit. If the dark time does not conform to that which would be produced by the desired line-to-line spacing, the circuit stops the tape travel immediately or otherwise indicates that the tape is not within the desired set specifications. The logic circuit includes a clock-pulse generator connected through a gating means controlled by the output of the tape reader for supplying pulses to a counter. The counter counts the number of clock pulses generated between each hole. If the hole spacing or dark time is within tolerance the counter is recycled at each pulse from the tape reader, but if the count is over or under a predetermined count limit the circuit generates an error signal which can be used to turn the reader off or otherwise notify the operator of a malfunction.

It is, therefore, an object of the present invention to provide a versatile device for dimensional verification of punched tapes which performs information column spacing checks with greater speed and accuracy than that of the prior art devices.

Further, it is an object of the invention to provide a new and improved apparatus for sensing the spacing of sprocket pulses associated with a moving record medium wherein a single sensing element is disposed adjacent the record medium so as to sense the sprocket pulses which, in turn, start and stop a counting device between pulses so that the spacing between each sprocket pulse is checked against a predetermined count.

Still another object of this invention is to provide a device for checking the spacing between lines of information on a punched tape which is readily adaptable to checking tapes of various information line spacing and reading speed.

Other objects and many of the attendant advantages of the present invention will become evident from the following description when taken in conjunction with the accompanying drawings.

DETAILED DESCRIPTION

Figure 1:
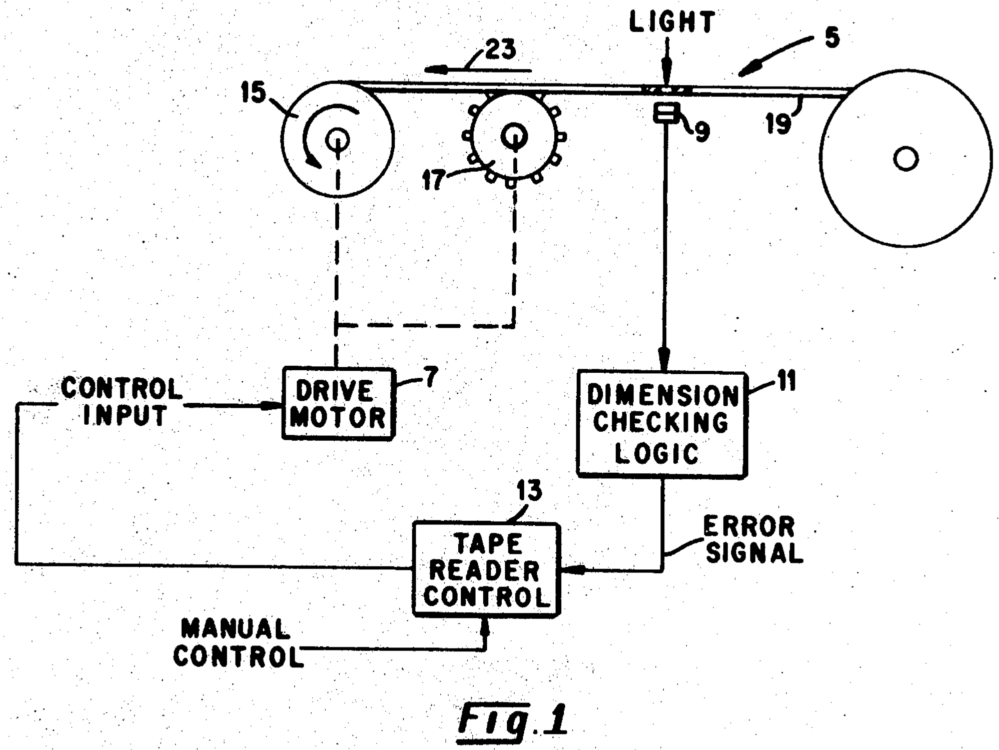
FIG. 1 is a schematic diagram according to the present invention.
Figure 2:
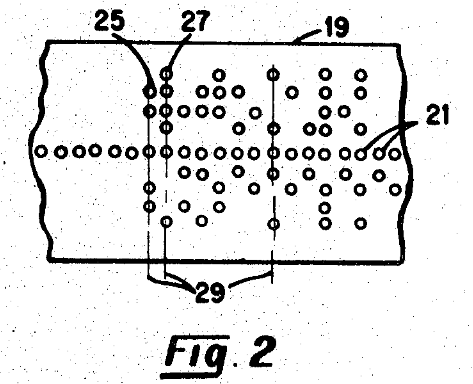
FIG. 2 illustrates a section of a punched paper tape shown in FIG. 1.

Referring now to FIG. 1, there is shown a preferred embodiment of the invention which comprises a conventional tape reader mechanism 5 including a drive motor 7 and a light sensitive detector 9, dimension checking logic circuit 11, and a tape-reader control circuit 13. The tape reader mechanism may take the form of any suitable tape reader. Generally, these tape readers take the form of a takeup means such as reel 15 and sprocket drive wheel 17 which engages a tape 19 along the sprocket drive column 21 (FIG. 2). The reel 15 and drive wheel 17 are driven from the drive motor 7 to move the tape at a constant speed in the direction of arrow 23.

Shown in FIG. 2 is a section of the punched tape 19 having thereon the series of sprocket channel holes 21 which extend along the length of the tape. In addition to the sprocket holes, the tape has punched therein lines of digital data such as at 25 and 27, each line extending laterally across the tape. It will be noted that each data line is centered along a line 29 passing through the center of a respective hole of a sprocket channel 21 of the tape.

It is a generally accepted practice in the art to employ light sensitive detectors, such as the photodiode 9, positioned adjacent the tape and aligned to view the light from any suitable source, as shown by the arrow in FIG. 1, passing through the tape holes as the tape is moved over the diode reader. The diode generates an output signal each time it is exposed. Tape readers of the type are manufactured by many companies and the operation is well understood by those skilled in the art.

The photo diode 9 aligned to read the sprocket channel is the only one of interest for the purpose of verifying the tape dimensions according to the present invention. Therefore, the remaining sensors of the reader are not shown. The output of the tape reader is fed into the dimension-checking logic circuit 11 whose output is fed into the control circuit 13. As indicated in FIG. 1, the tape reader controller 13 is also provided with manual controls whose function will be explained later.

Figure 3:
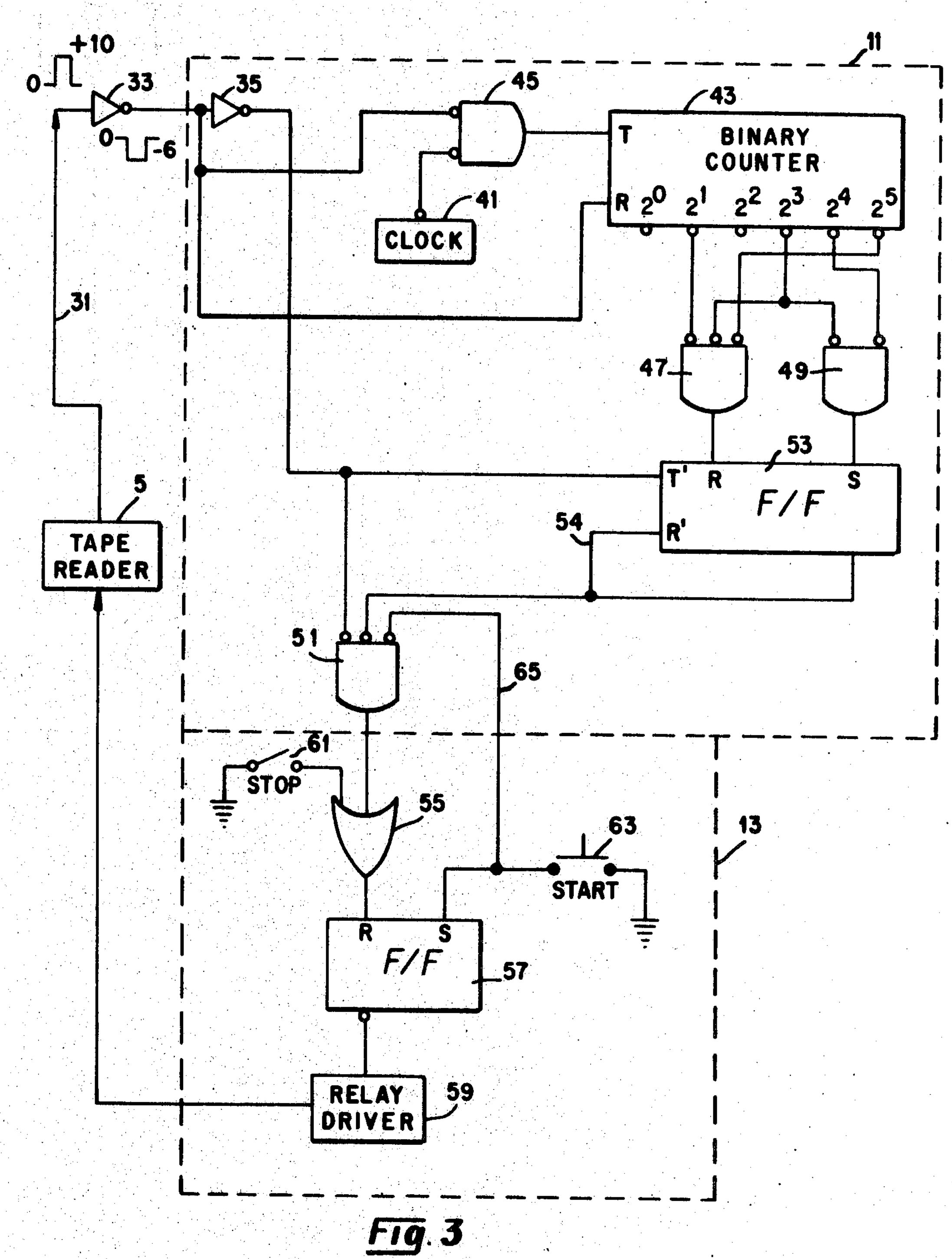
FIG. 3 is a schematic circuit diagram of a device according to FIG. 1.

Referring now to FIG. 3, the circuit is illustrated in greater detail. All of the various components are well known standard items. The tape reader 5 is shown in block form with the output lead 31 from the sprocket column diode reader 9 (FIG. 1). In this particular embodiment the output of the sprocket column photodiode is zero when the photodiode is exposed and is at +10 volts when the region between sprocket holes masks the photodiode. Thus, in terms of conventional logic symbols the output is a 0 at zero volts out and 1 at +10 volts out. The logic levels for the logic circuitry are correspondingly zero volts 1 and −6 volt 0. Thus, a level converter inverter 33 is provided in series with the input of circuit 11 to make the tape reader output compatible with the circuit 11 logic levels. Obviously, it is within the skill of the art to provide various other logic levels of operation.

As shown, the logic circuit 11 includes an inverter 35 at the input of the circuit. An astable multivibrator clock 41 is provided for generating a continuous square-wave output at a selected frequency. The output of clock 41 is connected to one input of a NOR gate 45 while the second input is connected to the output of inverter 33. The output of gate 45 is connected to the trigger T input of a binary counter 43 which counts positive-going transitions in the square wave clock signal gated thereto. The counter is adapted to store at least 43 counts in this particular example. The "reset" input of counter 43 is connected to the output of inverter 33. The remaining logic circuit consists of NOR gates 47, 49, and 51, and a "Count OK" flip-flop 53. The flip-flop 53 checks the count registered in counter 43 between each sprocket column space in a manner to be explained later in the operation of the circuit. Further, various arrangements of connection between the counter 43 and gates 47 and 49 may be made depending on the speed and sprocket hole spacing of the tape to be checked or verified. In this particular example, gate 47 is connected so as to be enabled at the count of 42, therefore the inputs are connected to the $2^1$, $2^3$, and $2^5$ outputs of counter 43. Gate 49 is to be enabled at the count of 24, therefore, its inputs are connected to the $2^3$ and $2^4$ outputs of counter 43. It will be evident to one skilled in the art that various other counting periods may be had by changing the connections to gates 47 and 49 through, for example, a manual switch (not shown) or varying the clock pulse rate according to the sprocket hole spacing of the tape being verified.

In either case the output of NOR gate 49 is connected to the set S input of flip-flop 53 while the output of S 47 is connected to the reset R input of flip-flop 53. Flip-flop 53 is self steering; in the set state it enables itself to be reset when a positive-going pulse 1 is applied to the trigger T′ input thereof. The trigger input T′ of flip-flop 53 is connected to the output of inverter 35 so that it will be reset at the beginning of the spacing or dark time counting period.

NOR gate 51 has three inputs: the first is connected to the output of inverter 35, the second is connected to the set output of flip-flop 53, and the third is connected through switch 63 of controller 13 to ground 1 potential. The output of gate 51 is connected to one input of an OR gate 55 the other input of which is connected to ground 1 through a "stop" switch 61. The output of gate 55 is connected to the reset R input of a "run" flip-flop 57 while the "set" S input of flip-flop 57 is connected to the ungrounded side of switch 63. The R output of flip-flop 57 is connected to a conventional relay driver 59 to provide the control input for the tape reader driver motor 7 (FIG. 1).

Operation of the circuit of FIG. 3 will be described first in terms of its response to an in-specification tape which is moved at constant velocity through the reader. When the leading edge of an opaque region of the tape masks the photodiode, the output of the reader goes from 0 to +10 volts and remains at this value until the photodiode is exposed by the succeeding sprocket hole. Thus, the reader output signal is a square pulse whose width is proportional to the line-to-line spacing.

The +10 volts from the photodiode is inverted and reduced to −6 0 volt by the level-converter and inverter 33. The resulting high level 1 output from inverter 35 is applied as a disabling input to NOR gate 51. The zero-output of inverter 33 enables NOR gate 45, keeping in mind that all inputs of a NOR gate must be at 0 before the output assumes a 1. Gate 45 is enabled by the next negative-going 0 clock pulse from multivibrator clock 41 giving a positive-going trigger to the counter 43 to register one count each time that a clock pulse is received. The frequency of the clock is preset relative to the dark time of a properly punched tape, so that a convenient number of pulses, (e.g., 32) will be generated during each period when the photodiode is masked by the tape. Thus, each pulse represents about 3 percent of the acceptable line-to-line spacing.

When twenty-four counts have been stored in counter 43, outputs $2^3$ and $2^4$ are 0 and NOR gate 49 is enabled by the counter to assume a 1 output, setting the Count OK flip-flop 53. The set output of the flip-flop becomes a 1, disabling an input to NOR gate 51 and also enabling itself to reset if a positive-going transition is applied to its trigger T input by means of connection 54 to an R′ input of the flip-flop. This is the self-steering feature of flip-flop 53 which is a conventional way of connecting a flip-flop and is well known in the art.

When the next sprocket hole exposes the photodiode, the photodiode input drops to zero. As a result, the inverter 35 output applies a 0 to NOR gate 51. The inverter 33 output becomes a 1, disabling gate 45 and thereby blocking the clock pulses. The inverter 33 output resets the counter 43 to zero counts. The Count OK flip-flop 53 remains set, so that one input of NOR gate 51 remains disabled. Thus, the gate has not generated a one-output ("error signal"), and the line-to-line spacing is known to be acceptable.

In the event the spacing being checked is smaller than the acceptable value, the photodiode will be masked for a shorter-than normal time. Consequently, its output will return to zero before the stored count reaches twenty-four. Now the inputs of gate 51 are enabled —one by the 0 on line 65; one by the zero-output from inverter 35; and one by the zero-output from the set output of flip-flop 53 (which in the absence of 24 counts has not been set by the counter). The output of gate 51 becomes a 1, enabling OR gate 55 to reset the run flip-flop 57. The reset output flip-flop 57 becomes a 1, causing the relay driver to stop the reader immediately, stopping the out-of-tolerance part of the tape near the reading head.

If the line-to-line spacing is larger than normal, the count stored in counter 43 will reach a higher value (e.g., 42) before the photodiode output returns to zero. In this case, NOR gate 47 will be enabled by the counter and will reset flip-flop 53 which was set by gate 49 when the count reached twenty-four. Thus, the set output of flip-flop 53 goes to 0, enabling one of the inputs to gate 51, which will generate an error signal as soon as the next sprocket hole reduces the photodiode output to zero and a 0 is applied to gate 51 from the output of inverter 35. The circuit responds in this same manner if one of two succeeding holes is offset laterally from its proper position, since a small lateral displacement will be reflected in a somewhat longer masking time for the photodiode.

The above-mentioned counts of 24 and 42 represent, respectively, a tolerance of −25 percent and +25 percent in time, which must be allowed to accommodate variations in reader speed and switching points in the reader circuitry. This tolerance in time corresponds to a considerably lower variation in line-to-line spacing.

Stop switch 61 is provided to permit manual stopping of the tape reader and of the tape-checking process. The closing of switch 61 admits a simulated "error signal" by applying a 1 to the OR gate 55. Line 65, connected between the "start" push-button 63 and the "run" flip-flop 57, disables NOR gate 51 by applying a 1 to an input during the short period that the push-button is closed and the tape is not traveling at normal velocity.

In operation, the present circuit can be relied upon to detect errors at least as small as ± 15 percent of a line-to-line spacing of 0.1 inch at a reading speed of 500 lines a second.

It will be seen that a very versatile tape verifier has been provided which checks line-to-line spacing of a punched tape with increased speed and accuracy with the use of only one sensing element, thereby eliminating the need for critical initial and realignment of dual sensors for verifying tapes of differing line-to-line spacing.

While the foregoing description of the invention illustrates the best form of the invention now known, it will be apparent to those skilled in the art that various modifications and changes may be made in the apparatus without departing from the spirit and scope of the invention as set forth in the claims attached hereto and forming a part of this specification.

I claim:

1. A circuit for dimensional verification of a moving punched tape having a continuous column of sprocket holes aligned with laterally extending punched holes of the tape, comprising:

a tape reader including a drive mechanism for moving said tape at a constant speed and a sprocket hole sensing element positioned adjacent said tape and activated to produce an output signal responsive to the passing of each of said sprocket holes past said sensing element;

a counter having a pulse count input and a reset input, said reset input being connected to receive the output of said sensing element so that said counter is reset each time said sensing element is activated;

a clock pulse generator;

a first gate having a first input connected to receive pulses generated by said sensing element, a second input connected to said clock pulse generator and an output connected to said pulse count input of said counter for gating said clock pulses to said counter for a period of time that said sensing element is masked by the spacing between the sprocket holes of said tape;

a second gate having a plurality of inputs connected to selected outputs of said counter so that said second gate is enabled at a predetermined low count registered in said counter, said low count being slightly below the counts registered for a normal sprocket hole spacing interval;

a third gate having a plurality of inputs connected to selected outputs of said counter so that said third gate is enabled at a predetermined high count registration in said counter, said high count being slightly above said normal count;

a first bistable switching means having a set input connected to the output of said second gate, a reset input connected to the output of said third gate so that said switching means is switched to the set state upon receiving an output from said second gate and switched to the reset state upon receiving an output from said third gate and a trigger input connected to receive the output of said sensing element to reset said switching means each time said sensing element is activated;

a fourth gate giving a first input connected to receive said signal from said sensing element, a second input connected to said set output of said first bistable switching means and a third input, said fourth gate being enabled by said first bistable switch to pass an error signal when said first bistable switch is in the set state and a sprocket hole is detected by said sensing means, indicating an out of tolerance hole spacing;

an OR gate having first and second inputs and an output, said first input connected to the output of said fourth gate;

a stop switch having one end connected to ground potential and the other end connected to said second input of said OR gate;

a second bistable switching means having set and reset inputs, said reset input connected to the output of said OR gates;

a start switch having one end connected to ground potential and the other end connected to said set input of said second bistable switching means and said third input of said fourth gate; and means connected between a reset output of said second bistable switching means and said tape reader for stopping and starting said tape reader according to the state of operation of said second bistable switching means.

2. A circuit as set forth in a claim 1 wherein said clock pulse generator is an astable multivibrator having an adjustable pulse rate and said counter is a binary counter.